US007764045B2

(12) United States Patent
Hoffman et al.

(10) Patent No.: US 7,764,045 B2
(45) Date of Patent: Jul. 27, 2010

(54) BATTERY CHARGER

(75) Inventors: Peter F. Hoffman, Avon, OH (US); Rachel P. Devereaux, Ballwin, MO (US); Michael J. Brandon, II, North Ridgeville, OH (US); Richard H. Chapman, Camillus, NY (US); Mark A. Ferguson, Memphis, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 552 days.

(21) Appl. No.: 11/543,555

(22) Filed: Oct. 5, 2006

(65) Prior Publication Data

US 2008/0084214 A1  Apr. 10, 2008

(51) Int. Cl.
*H02J 7/00* (2006.01)
*H01M 2/10* (2006.01)

(52) U.S. Cl. .................. 320/107; 320/110; 320/112; 429/97; 429/99

(58) Field of Classification Search .............. 320/128, 320/110, 116, 107, 112, 113, 114, 115; 200/293; 429/99, 100, 52, 97
See application file for complete search history.

(56) References Cited

U.S. PATENT DOCUMENTS

| 4,546,302 A | 10/1985 | Smith |
| 4,629,962 A | 12/1986 | Arakawa |
| 4,766,361 A | 8/1988 | Pusateri |
| 4,820,965 A | 4/1989 | Siemer |
| 4,876,496 A | 10/1989 | Duncan |
| 5,057,761 A | 10/1991 | Felegyhazi |
| 5,072,167 A | 12/1991 | Zias |
| 5,103,155 A | 4/1992 | Joannou |
| 5,184,059 A | 2/1993 | Patino |
| 5,371,455 A | 12/1994 | Chen |
| 5,486,750 A | 1/1996 | Walborn |
| 5,686,808 A | 11/1997 | Lutz |
| 5,686,811 A | 11/1997 | Bushong |
| 5,965,998 A | 10/1999 | Whiting |

(Continued)

FOREIGN PATENT DOCUMENTS

DE    3827045 A1    2/1990

(Continued)

OTHER PUBLICATIONS

"Charge Manager 2020", Dec. 2003, Voltcraft Plus 2005/2006 Catalog, www.conrad.de, Part No. 51 20 80-99. p. 23, Germany.

(Continued)

*Primary Examiner*—Edward Tso
*Assistant Examiner*—Alexis Boateng
(74) *Attorney, Agent, or Firm*—Gregory J. Adams

(57) ABSTRACT

A device (100) such as a battery charger includes a body (102), a movable member (104, 402), and a plurality of battery bays (108). Moving the member (104, 402) toward a first position increases a distance between respective first (132) and second (114) battery contacts so that a battery may be inserted with zero or substantially zero insertion force. Moving the member (104, 402) in the second direction decreases the distance between the first and second battery contacts. In one implementation, the device (100) is polarity agnostic.

16 Claims, 11 Drawing Sheets

U.S. PATENT DOCUMENTS

| | | | |
|---|---|---|---|
| 5,966,821 A | 10/1999 | Armbruster | |
| 6,130,519 A | 10/2000 | Whiting | |
| 6,320,358 B2 | 11/2001 | Miller | |
| 6,384,575 B1 * | 5/2002 | Chen et al. | 320/110 |
| 6,759,833 B1 | 7/2004 | Chen | |
| 6,769,787 B2 | 8/2004 | Ferguson et al. | |
| 6,844,705 B2 | 1/2005 | Lai | |
| 6,950,030 B2 | 9/2005 | Kovarik | |
| 2002/0063550 A1 | 5/2002 | Chen | |
| 2002/0117995 A1 | 8/2002 | Oh | |
| 2003/0062251 A1 | 4/2003 | Pfeiffer | |
| 2005/0110467 A1 | 5/2005 | Thomason | |
| 2006/0055368 A1 | 3/2006 | Chang | |
| 2006/0071641 A1 | 4/2006 | Ward | |

FOREIGN PATENT DOCUMENTS

| | | |
|---|---|---|
| DE | 20308192 U1 | 9/2003 |
| EP | 1351364 B1 | 11/2005 |
| GB | 2240439 A | 7/1991 |

OTHER PUBLICATIONS

Patent Cooperation Treaty (PCT), International Search Report and Written Opinion for Application No. PCT/US2007/021268, filed Oct. 3, 2007, mailed Mar. 28, 2008, European Patent Office, Netherlands.

Patent Cooperation Treaty (PCT), International Search Report and Written Opinion for Application No. PCT/US2007/021269, filed Oct. 3, 2007, mailed Mar. 31, 2008, European Patent Office, Netherlands.

"Automatic, fast chargers protect battery life", L'Electricite Automobile, vol. 26, No. 393-394, Jul.-Aug. 1972.

"Automatic battery charger", Herre H., Elektor, vol. 5, No. 7-8, Jul.-Aug. 1979, pp. 72.

"A buffer type charger for NiCd batteries", Martin P., Revista Espanola de Electronica, vol. 31, No. 359, Oct. 1984, pp. 76-77.

"Circuit Provides Reverse-Battery Protection", Maxim Integrated Products, Maxim/Dallas, App Notes, Battery Management, Application Note 480, Dec. 21, 2000, pp. 1-2.

"Fast, Low-Voltage, Dual 4'Ω SPDT CMOS Analog Switches", Maxim Integrated Products, MAX4635/MAX4636, 19-1709; Rev 2; May 2003, pp. 1-11.

* cited by examiner

BATTERY CHARGER

BACKGROUND

The present application relates to electrical appliances which use batteries. While it finds particular application to battery chargers, it is also applicable to battery powered electrical devices.

Recent years have seen a proliferation of battery powered electrical devices. Digital cameras, personal digital assistants (PDAs), hand held games, portable audio players, remote control devices, wireless computer keyboards and mice, and mobile telephones are but a few examples of this trend.

Rechargeable (secondary) batteries, such as nickel-metal hydride (NiMH), nickel-cadmium (NiCd), and lithium ion (LiIon) electrical cells, have likewise gained increasing acceptance as a renewable power source for these and other devices. Rechargeable batteries are typically well-suited for use in relatively high-drain devices, making them attractive in a wide variety of applications. As they can be recharged and reused, rechargeable batteries can also provide convenience and cost advantages relative to non-rechargeable (primary) batteries.

One factor which can affect the acceptance of rechargeable batteries is the convenience and ease of use of the charger needed to charge them. To provide a reliable electrical connection to the batteries being charged, the charger's battery contacts exert a compressive force on the battery terminals. When inserting a battery for charging, however, it is necessary to overcome this contact force. The contact force must likewise be overcome when removing the battery from the charger. Unfortunately, the contact force can make it difficult to insert and/or remove the batteries, especially where there is limited access to the batteries, if the batteries are otherwise difficult to grasp, or where the user has limited strength or dexterity.

Still another factor which can affect the convenience of the charger is the need to insert the batteries in the proper polarity. This is especially true where the charger provides few visual or physical cues as to the proper battery orientation, under low light conditions, or where the user has limited technical expertise or is otherwise uncomfortable with the charging process.

Other considerations include the flexibility and size of the charger. For example, many users have a number of battery powered appliances, each requiring different size batteries. Consequently, a charger which is able to charge batteries of different sizes has the potential to provide significant cost and convenience advantages. Again, the convenience of the charger is enhanced where the charger is readily configured to accept the different size batteries. At the same time, it is generally desirable that charger be relatively compact, even for chargers which are intended primarily for use in a fixed location.

SUMMARY

Aspects of the present application address these matters, and others.

According to one aspect of the application, a polarity agnostic battery charger includes zero insertion force battery contacts.

According to another aspect of the application, a battery charger includes a first battery contact, a second battery contact, and a first user operable member in operative mechanical communication with and movable with respect to the first battery contact. Moving the first member in a first direction causes the first battery contact to move away from the second battery contact so that the distance between the first and second battery contacts is approximately equal to or greater than a longitudinal dimension of a first generally cylindrical battery. Moving the first member in a different, second direction causes the first battery contact to move toward the second battery contact so that the first and second battery contacts make electrical contact with respective first and second terminals of the first battery when the first battery is disposed between the first and second battery contacts.

According to another aspect, a method includes releasably engaging, in response to a user initiated movement of a first member toward a first position, a second member in operative mechanical communication with a first battery contact so as to increase a distance between the first battery contact and a second battery contact. The method also includes receiving a first generally cylindrical battery between the first and second battery contacts while the first member is in the first position, and, in coordination with a movement of the first member toward a second position, decreasing the distance between the first and second battery contacts so that the first and second battery contacts make electrical contact with respective first and second terminals of the first battery. The battery has a longitudinal dimension which is less than or approximately equal to the distance between the first and second battery contacts;

According to another aspect, an apparatus includes a body and a first pair of battery contacts in operative mechanical communication with the first cover. The first cover is mounted for pivotal motion relative to the body, and the cover pivots between an open position for inserting at least a first battery in a battery receiving region of the apparatus and a second position. Pivoting the cover to the open position allows a first battery to be inserted between the first pair of battery contacts with substantially zero insertion force and pivoting the cover to the second position causes the first pair of battery contacts to apply a contact force to terminals of the first battery.

According to another aspect, an apparatus includes a battery support that has a generally funnel shaped cross section which supports four generally cylindrical batteries in a two dimensional close packed array. The apparatus also includes a plurality of zero insertion force battery contacts for making electrical contact with first and second terminals of the batteries.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
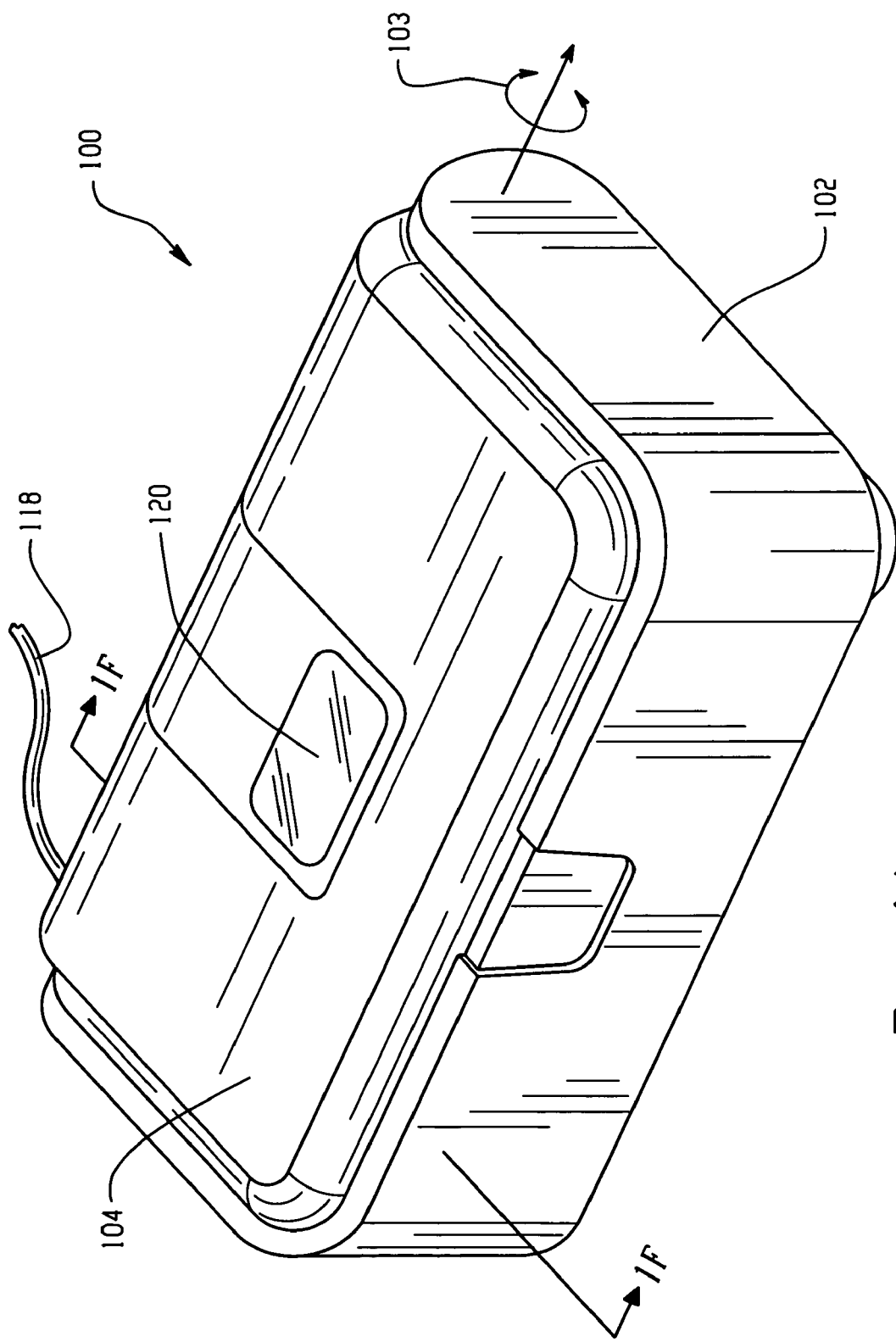
FIGS. 1A and 1B are perspective views of a battery charger.
Figure 1B:
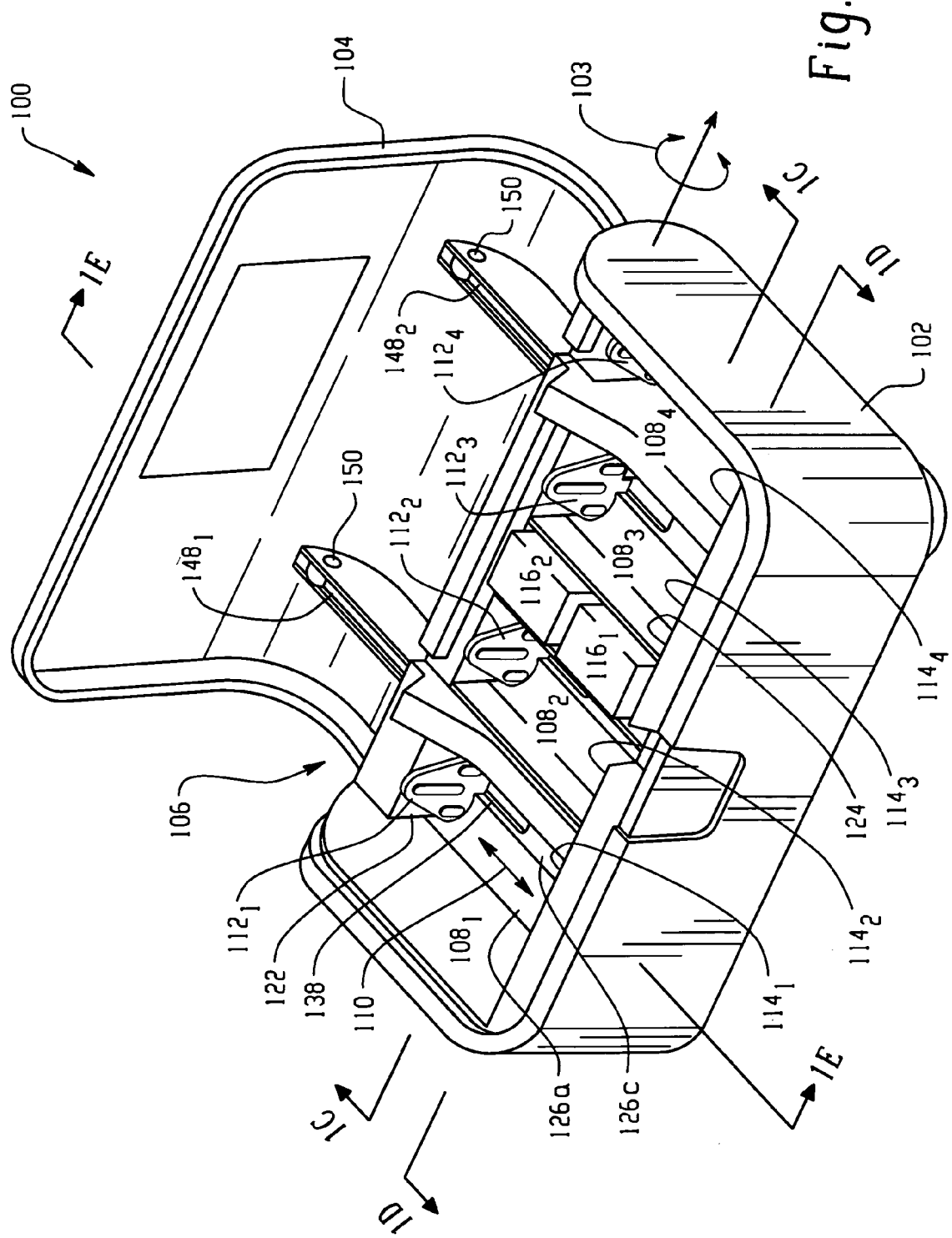

With reference to FIGS. 1A and 1B, a battery charger 100 includes a body 102 and a cover 104 which is mounted for pivotal motion relative to the body 102 about a pivot or hinge axis 103. FIG. 1A depicts the cover 104 in a closed position, whereas FIG. 1B depicts the cover in an open position which allows a user to access a battery receiving region 106. In the illustrated embodiment, the battery receiving region 106 includes five (5) battery receiving bays $108_1$, $108_2$, $108_3$, $108_4$, $108_5$.

The first through fourth bays $108_{1-4}$ are configured to receive one or more generally cylindrical batteries having positive and negative terminals disposed on opposite ends of the battery. The batteries are received in the bays $108_{1-4}$ with their longitudinal axes extending generally in the direction 110. The bays $108_{1-4}$ each include movable contact supports $112_{1-4}$ which are disposed generally toward the rear of the respective bays $108_{1-4}$. The supports 112 carry first battery contacts 132a,b,c (see FIG. 1C) which are adapted to make electrical contact with the first terminals of the battery or batteries received in the respective bays $108_{1-4}$. Second, generally stationary battery contacts $114_{1-4}$, which are disposed generally toward the front of the respective bays $108_{1-4}$, are adapted to make electrical contact with the first terminal of the battery or batteries received in the bays $108_{1-4}$.

As will be described further below, the first 132 and second 114 battery contacts are zero insertion and removal force battery contacts. More specifically to the illustrated embodiment, the contact supports 112 are in operative mechanical communication with the cover 104 so that, when the cover is in the open position, the spacing between the contacts 132, 114 is greater than the longitudinal dimension of the battery or batteries to be inserted in the respective bays $108_{1-4}$. As a consequence, the batteries can be inserted in the bays $108_{1-4}$ without overcoming the contact force. When the cover 104 is in the closed position, the spacing between the contacts 132, 114 is such that the contacts 132, 114 make electrical contact with the terminals of the battery or batteries received in the respective bays. Reopening the cover 104 again increases the spacing between the contacts 112, 114 so that the batteries can be removed without overcoming the contact force.

The fifth bay $108_5$ is configured to receive first $116_1$ and second $116_2$ generally rectangular nine volt (9V) batteries for charging. Suitable battery contacts disposed near the bottom of the fifth bay $108_5$ provide the requisite battery connections. Also disposed in the housing 102 is conventional battery charging circuitry. A power cord 118 connects the charger 100 to a suitable power source, for example a wall cube which can be plugged into a standard alternating current (AC) power receptacle. An internally mounted, cover-actuated pushbutton switch automatically activates the charging circuitry when the cover 104 is closed, and a cover-mounted user interface 120 such as a liquid crystal display (LCD) indicates the operational status of the charger 100.

Figure 1C:
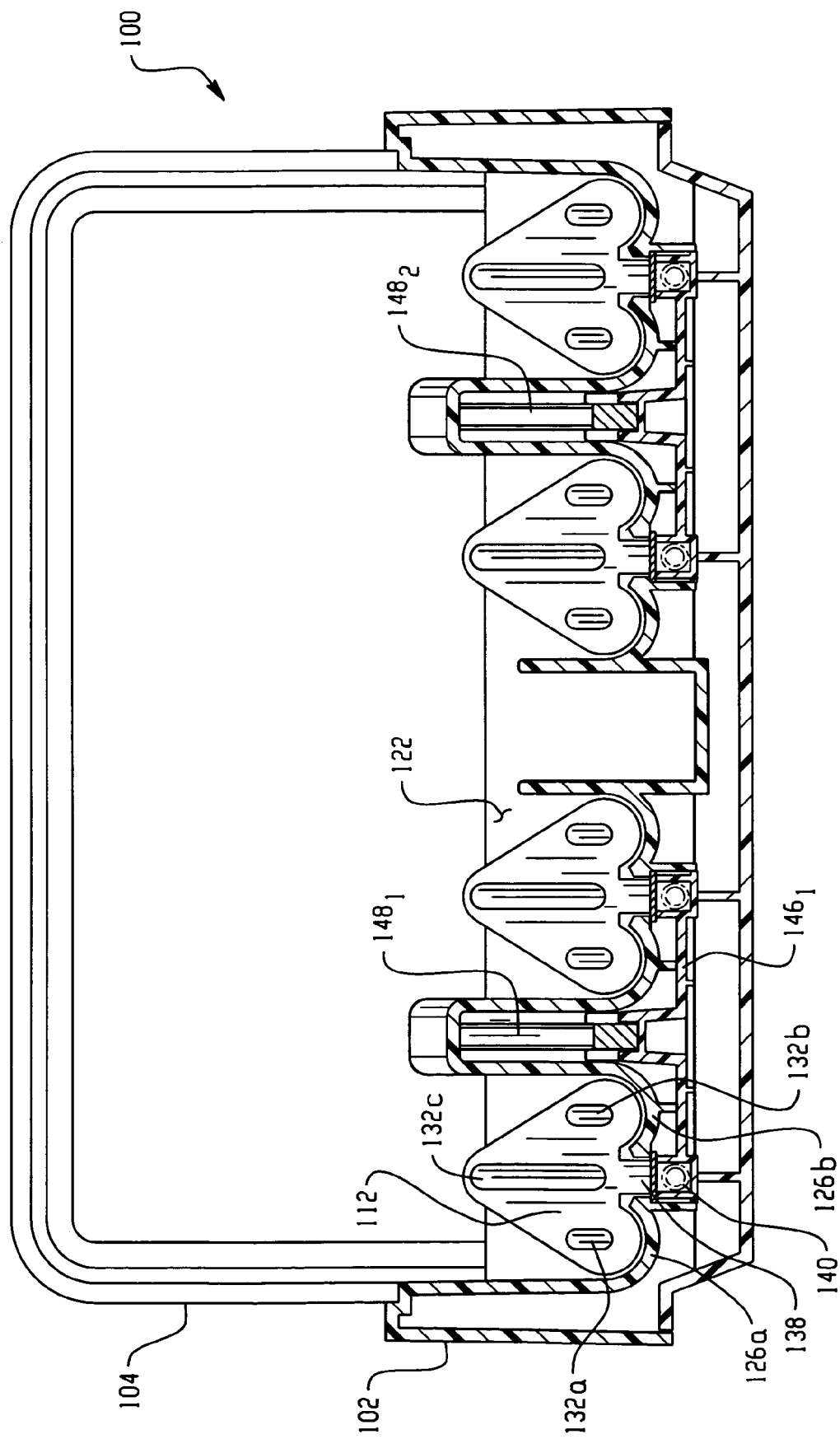
FIG. 1C the sectional view indicated by line 1C-1C of FIG. 1B.
Figure 1D:
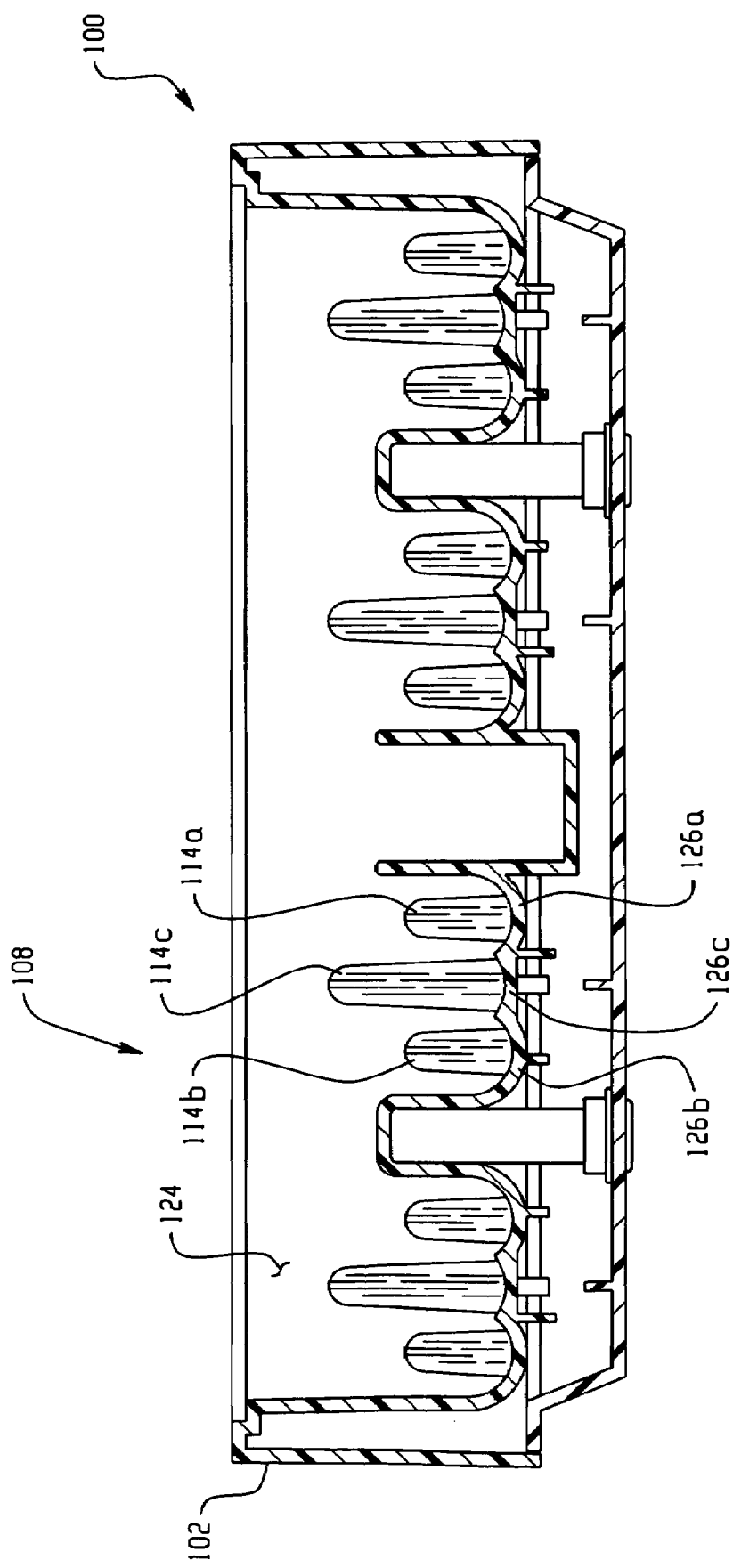
FIG. 1D is the sectional view indicated by line 1D-1D of FIG. 1B.

An exemplary one of the bays $108_{1-4}$ will now be described with additional reference to FIGS. 1C and 1D, it being understood that the first through fourth bays $108_{1-4}$ are similarly configured. Note that the batteries depicted in FIG. 1B have been omitted for ease of explanation.

The bay 108 includes a first, rear end wall 122 and a second, spaced apart front end wall 124. The distance between the walls 122, 124 is greater than the longitudinal dimension of the largest battery to be received in the bay 108.

Disposed at the bottom of the bay 108 is a battery tray which includes first $126_a$ and second $126_b$ outer battery supports and a third, central battery support $126_c$. The radii of the outer battery supports $126_a$, $126_b$ are selected to support batteries having a relatively smaller radial dimension, for example standard AA and AAA size batteries. The radius of the central battery support $126_c$ is slightly larger so as to additionally support batteries of a relatively larger radial dimension, for example standard C and D size batteries.

The second battery contact 114, which is located at the second, front end wall 124, includes first $114_a$ and second $114_b$ outer battery contacts and a third, central battery contact $114_c$. The outer contacts $114_a$, $114_b$ are positioned relative to the outer battery supports $126_a$, $126_b$ so as to make contact with the second terminal of AAA and AA size batteries received in the bay 108. The central contact $114_c$ is likewise positioned relative to the central battery support 126, so as to make contact with the second terminal of AAA, AA, C, and D size batteries.

The contact support 112 is fabricated from a metallic or other conductive material. First $132_a$, second $132_b$, and third $132_c$ contacts are formed as protrusions which make electrical contact with the first terminal of the battery or batteries received in the bay 108. The contact support 112 is mounted for slidable motion in a slot 138 formed in the battery tray. As will be appreciated, the direction of motion is generally parallel to the longitudinal axes 110 of the battery or batteries. A spring 140 connected between the contact support 112 and the underside of the battery tray nearer to the front end wall 114 urges the contact support 112 toward the front end wall 114.

Figure 2:
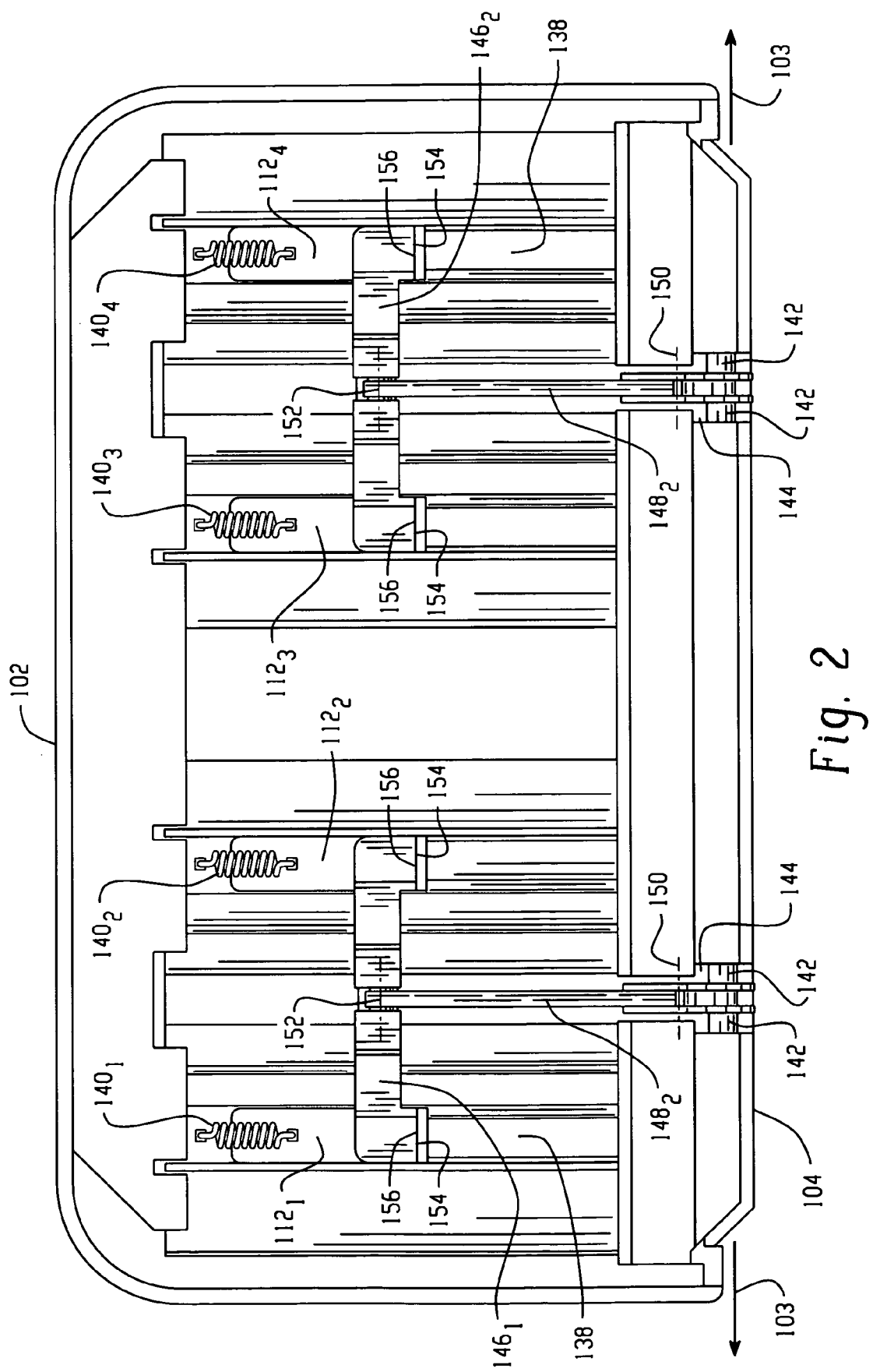
FIG. 2 is a bottom view of a battery charger.

FIG. 2 is a bottom view of the charger 100 with the bottom cover removed for ease of explanation. The cover 104 is pivotally attached to the housing 102 via hinge pins 142 which are advantageously formed as an integral part of the cover 104 and which snappingly engage corresponding recesses 144 in the body 102. First $146_1$ and second $146_2$ slide members are disposed on the underside of the battery trays for slidable motion in the direction 110. The rear portion 152 of the slide members 146 releasably engages front facing shoulders 154 formed on the contact supports 112. More specifically to the illustrated embodiment, the first slide member $146_1$ releasably engages the first $112_1$ and second $112_2$ contact supports, whereas the second slide member $146_2$ releasably engages the third $112_3$ and fourth $112_4$ contact supports. First $148_1$ and second $148_2$ link members are connected between the cover 104 and the respective first $146_1$ and second $146_2$ slide members.

Figure 1E:
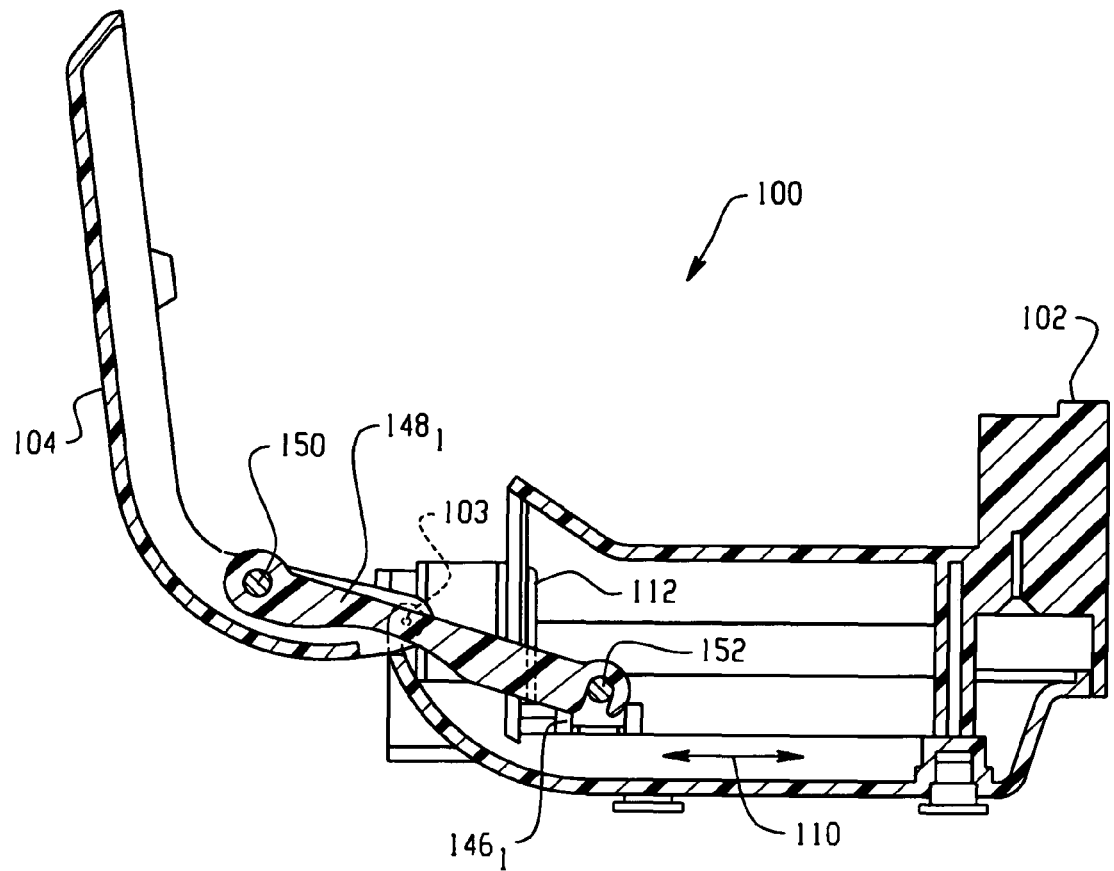
FIG. 1E is the sectional view indicated by line 1E-1E of FIG. 1B, showing the battery charger with a cover open.
Figure 1F:
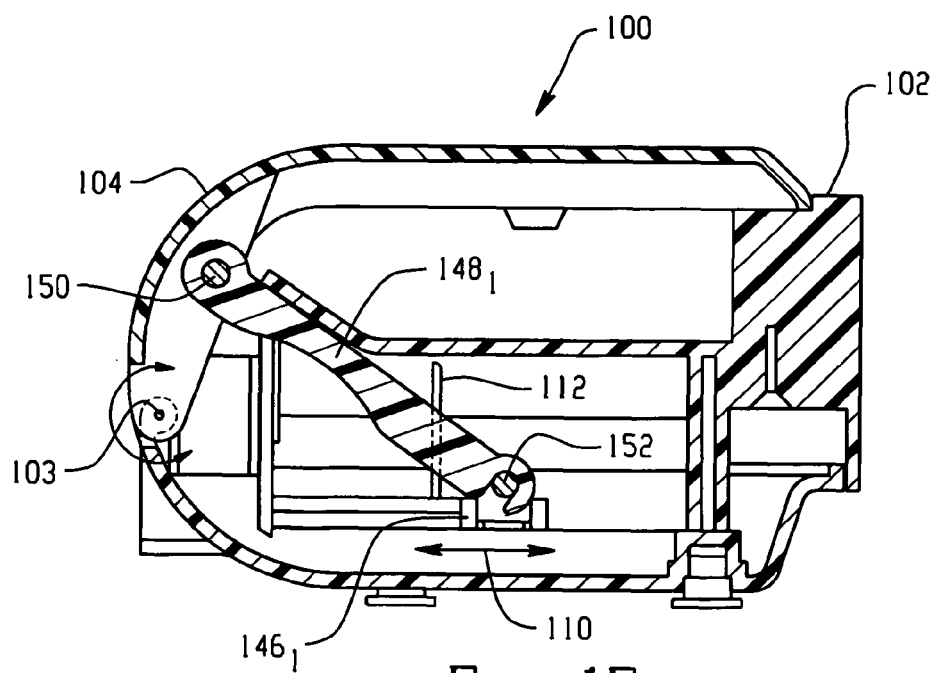
FIG. 1F is the sectional view indicated by line 1E-1E of FIG. 1B, showing the battery charger with the cover closed.

With reference to FIGS. 1E and 1F, a first end of each link members 148 is pivotally connected to the to the cover 104 for rotational motion about a pivot or hinge axis 150, while the second end of each link member 148 is pivotally connected to a respective slide member 146 for rotational motion about a pivot or hinge axis 152.

Opening the cover 104 urges the link members $148_1$, $148_2$ and hence their respective slide members $146_1$, $146_2$ toward the rear of the battery receiving region 106. The rear 154 of the slide members 146 releasably engages the shoulders 156 of the respective contact supports 112, overcoming the force exerted by the springs 140 and thus moving the contact supports 112 toward the rear of the battery receiving region 106. Note that, when the cover 104 is in the open position, a line extending between the link arm 148 pivot axes 150, 152 is located below the cover pivot axis 130. As a consequence, the force exerted by the springs 140 generates a moment about the pivot axis 130 which tends to maintain the cover 104 in the open position.

Closing the cover 104 causes the link members 148 and the slide members 146 to move toward the front of the battery receiving region 106. As a consequence, the springs 140 urge the contact supports 112 forward in coordination with the closing of the cover 104. If a battery is not installed in a given bay $108_{1-4}$, the contact support 112 moves forward to the limit of its travel. Where a battery (or batteries) is received in a bay $108_{1-4}$, a contact 132 engages the first end the battery, thus urging it toward the second battery contact 114. When the second end of the battery contacts the second battery contact 114, the contact support 112 is unable to move forward and the spring 140 applies a suitable contact force. The rear 154 of the respective slide member 146 disengages from the shoulder 156 of the respective contact support 112 so that the link member 148 and the slide member 154 continue to move forward in coordination with the closing of the cover 104.

Pivoting the cover 104 thus retracts each of the movable battery contacts 114, thus allowing the user to insert batteries in and/or remove batteries from the desired bays $108_{1-4}$ with zero insertion or removal force. As will also be appreciated, the forward travel of the respective contact supports $112_{1-4}$ depends on the size of the battery or batteries received in its corresponding bay $108_{1-4}$. As a result, the user may insert different size batteries in each bay $108_{1-4}$. Thus, for example, a user may elect to insert a single C size battery in one of the bays, one or more AAA size batteries in another of the bays, a single D size battery in still another bay, one or more AA size batteries in the fourth bay. Of course, the foregoing is but one possibility, and other combinations are possible.

Still other variations are contemplated. For example, one or more of the bays $108_{1-4}$ may be configured to selectively receive a single D size battery, a single C size battery, up to four (4) AA size batteries, or up to four (4) AAA size batteries. The battery supports and contact configuration of a device having two (2) such bays $108_1$, $108_2$ is illustrated in FIGS. 3A-3D.

Figure 3A:
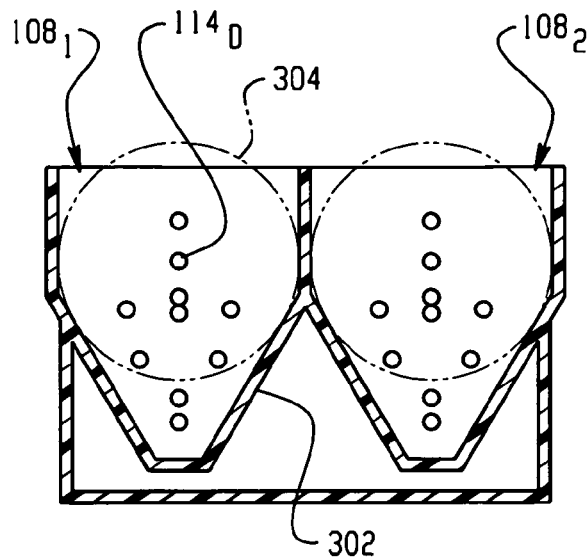
FIGS. 3A through 3D depict bays of a battery charger.

An exemplary bay 108 will now be described, it being understood that the first $108_1$ and second bays $108_2$ are similarly configured. The bay 108 includes a battery support 302 having a generally funnel or V-shaped section. With reference to FIG. 3A, the battery support 302 supports a D-size battery 304 so that its longitudinal axis is positioned at the horizontal center of the bay 108. A battery contact $114_D$ is positioned relative to the battery support 302 so as to make electrical contact with the second terminal of the battery 304.

Figure 3B:
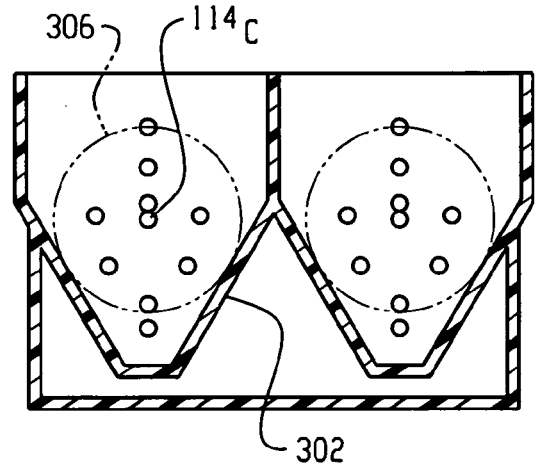

With reference to FIG. 3B, the battery support 302 also supports a C-size battery 306 so that its longitudinal axis is positioned at the horizontal center of the bay 108 and slightly below that of the D-size battery 304. A battery contact $114_C$ is positioned relative to the battery support 302 so as to make electrical contact with the second terminal of the battery 304.

Figure 3C:
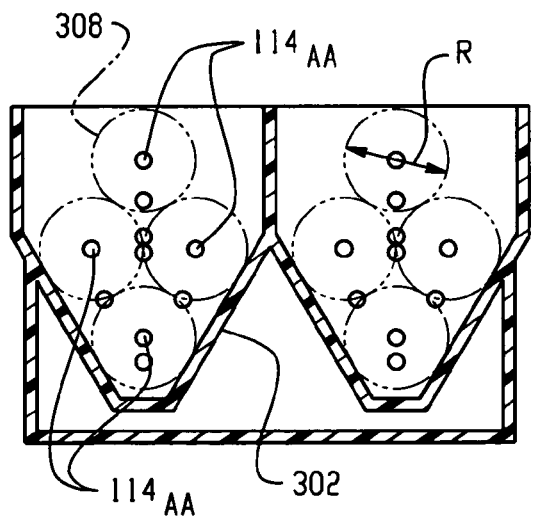

Turning now to FIG. 3C, the battery support 302 also supports up to four (4) AA size batteries 308 in a two (2) dimensional close packed array in which adjacent rows and columns are offset by one-half (½) the battery radial dimension R. A plurality of battery contacts $114_{AA}$ are positioned relative to the battery support 302 so as to make electrical contact with the second terminals of the batteries 308. As can be seen, a centroid of the array is coincident with a horizontal center of the battery support.

Figure 3D:
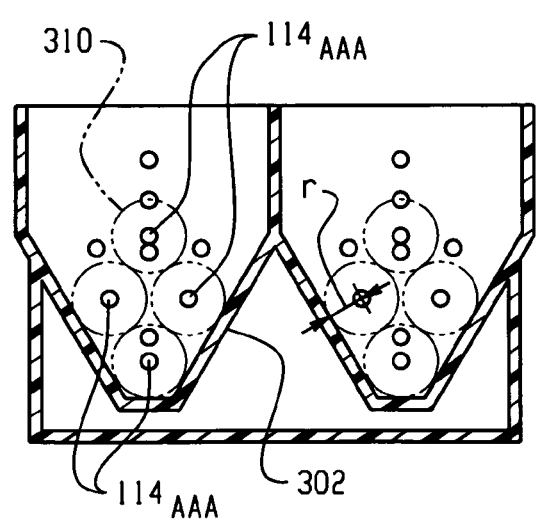

With reference now to FIG. 3D, the battery support 302 similarly supports up to four (4) AAA size batteries 310, again in a two (2) dimensional close packed array with adjacent rows and columns offset by the radius r of the batteries 310. A plurality of battery contacts $114_{AAA}$ are positioned relative to the battery support 302 so as to make electrical contact with the second terminals of the batteries 310.

The contacts 132 are likewise configured to make electrical contact with the first terminals of the respective batteries 304, 306, 308, 310. Note that the various contacts 114 need not be physically or electrically discrete; some or all of them may be combined so as to provide the desired electrical connections. In one example, the D size battery contact $114_D$, the C size battery contact $114_C$, one of the AA size battery contacts $114_{AA}$, and one of the AAA size battery contacts $114_{AAA}$ are combined in a single contact, and the remaining AA size battery contacts $114_{AA}$ and AAA size battery contacts $114_{AAA}$ are likewise combined in pair-wise fashion. Note also that one or more of the contacts 132 may also be electrically discrete.

A particular advantage the arrangement described above is that the battery support 302 tends to function as a hopper, thus using the force of gravity to funnel the battery or batteries inserted into a bay 108 into their correct position(s). As a consequence, the batteries are largely self positioning, particularly when the battery support 302 is used in combination with zero insertion force battery contacts 112, 114 and the hopper opening is disposed generally physically upwardly in the absolute sense. While the illustrated hopper accommodates one (1) C or D size batteries or up to four (4) AAA or AA size batteries smaller or larger hoppers which accommodate fewer or larger batteries or combinations of battery sizes may also be implemented.

Still other variations are contemplated. For example, one or more of the bays 108 may be configured to receive only a single battery. Thus, a bay 108 may be configured to receive a single D size battery, a single C size battery, a single AA size battery, or a single AAA size battery. In yet another alternative, one or more of the bays 108 may also be configured to receive multiple batteries of only a single size or of a relatively limited range of sizes. For example, a bay 108 may be configured receive a plurality of AA or AAA batteries, or otherwise receive any two (2) or more battery sizes selected from the group of AAA, AA, C, and D-size batteries. Still other battery sizes are also contemplated.

Greater or lesser numbers of bays 108 may also be provided. One or more of the bays 108 may also be provided with its own cover 104. A given cover 104 may also actuate the contacts 132 or more than one but less than all of the bays 108. A particular advantage of such arrangements is that they facilitate the independent operation of the various bays 108, for example where the user wishes to insert batteries in or remove batteries from a first bay while the batteries in another bay continue to charge.

The contacts 132, 114 may also be configured so that, when the cover 104 is in the open position, the spacing between the contacts 132, 114 is approximately equal to the longitudinal dimension of a battery to be received in the bay 108. As will be appreciated, such an arrangement simplifies insertion and removal of the batteries, especially compared to arrangements in which the contact supports 112 must be grasped and moved by the user. The contacts 132, 114 may also be configured to provide substantially zero insertion and removal force contacts. More particularly, the contact spacing is established so that while the contact force applied during insertion and/or removal of a battery is non-zero, it is nonetheless less than the contact force applied during charging.

In another alternative implementation, one or more of the bays 108 is provided with a lever which operates similarly to the cover 104. The lever may also be configured as a thumbwheel. In still another implementation, the movable battery contacts 112 may be actuated by a user operated slider accessible from the top of the charger 100, with a detent holding the slider in the open or retracted position.

Various link member 148 and slide member 146 implementations are also contemplated. For example, three (3) or more bays may share a common link member 148; a link member 148 may be provided in connection with each bay 108. The slide member or members 146 may be also be omitted, with a protrusion, pin, or the like extending from the link member 148 and engaging the moving battery contact 114.

Figure 4:
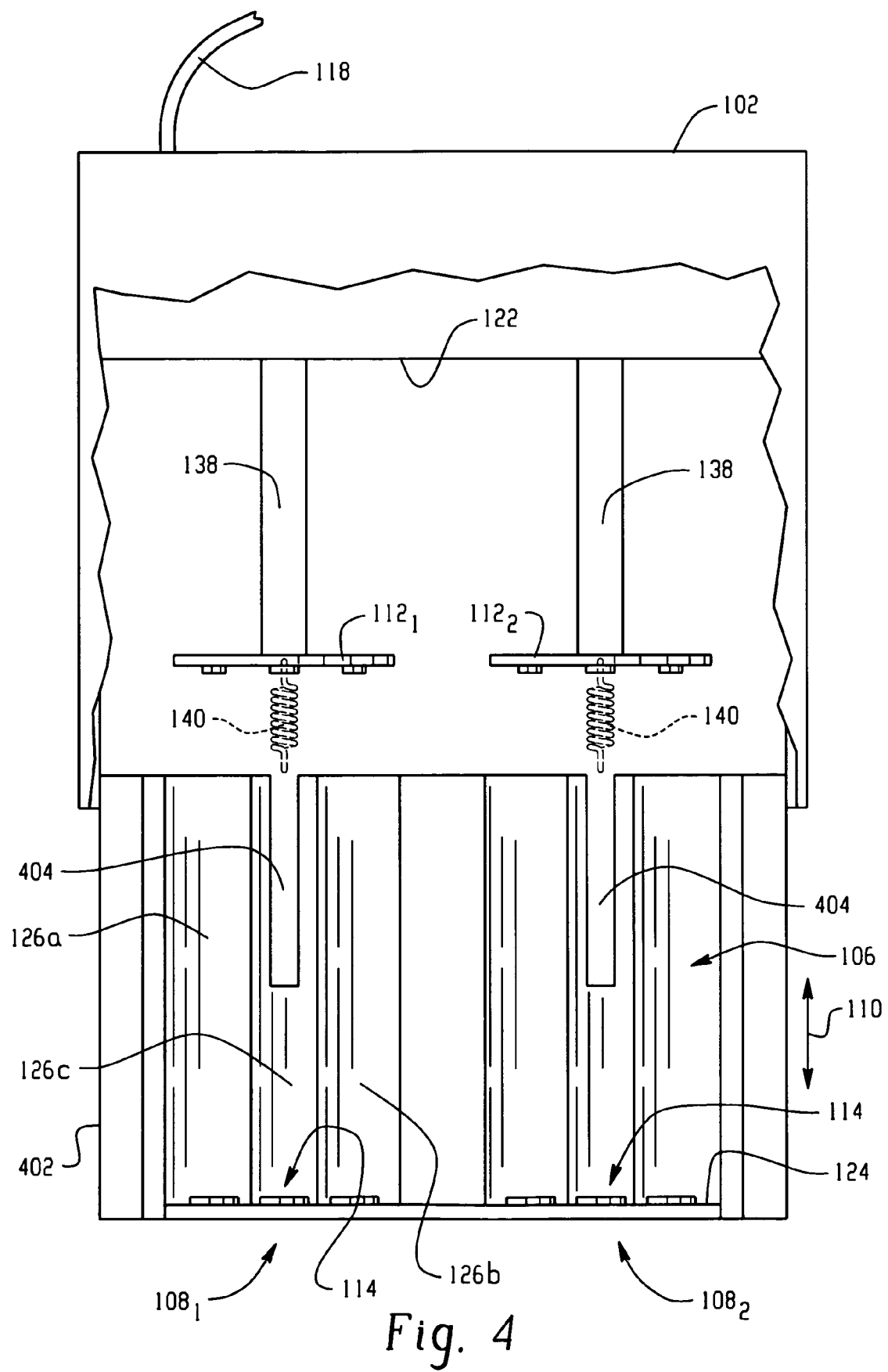
FIG. 4 is a top view of a battery charger.

The foregoing discussion has focused on an arrangement in which the battery trays are substantially stationary with respect to the body 102. Turning now to FIG. 4, a charger 100 includes a generally sliding or telescoping tray 402 located at the front of the charger 100 and which is movable relative to the body 102 in the direction 110. The movable battery contacts 112 are likewise movable in the direction 110 in the slots 138, with springs 140 urging the movable contacts 140 toward the front of the body 102. Suitable material free regions or slots 404 provided in the tray 402 provide clearance for the movable contacts 112 and/or the springs 140. In one implementation, the tray 402 is actuated manually by the user, with a suitable latch maintaining the tray 402 in the closed position. In another implementation, the tray is motorized.

With the tray 402 in the open position (as shown in FIG. 4), the springs 140 urge the movable battery contacts 112 toward the front of the charger 100. Where a battery (or batteries) is received in a bay 108, closing the tray 402 causes the first end of the battery to engage the corresponding contact support 112. If the second end of the battery is not already in contact with the front end wall 124 (or the contacts 114, as the case may be), the movable contact 114 tends to urge the battery forward. Upon reaching the front of the bay 108, the second end of the battery then causes the contact support 112 to retract in coordination with the closing of the tray 402.

Figure 5:
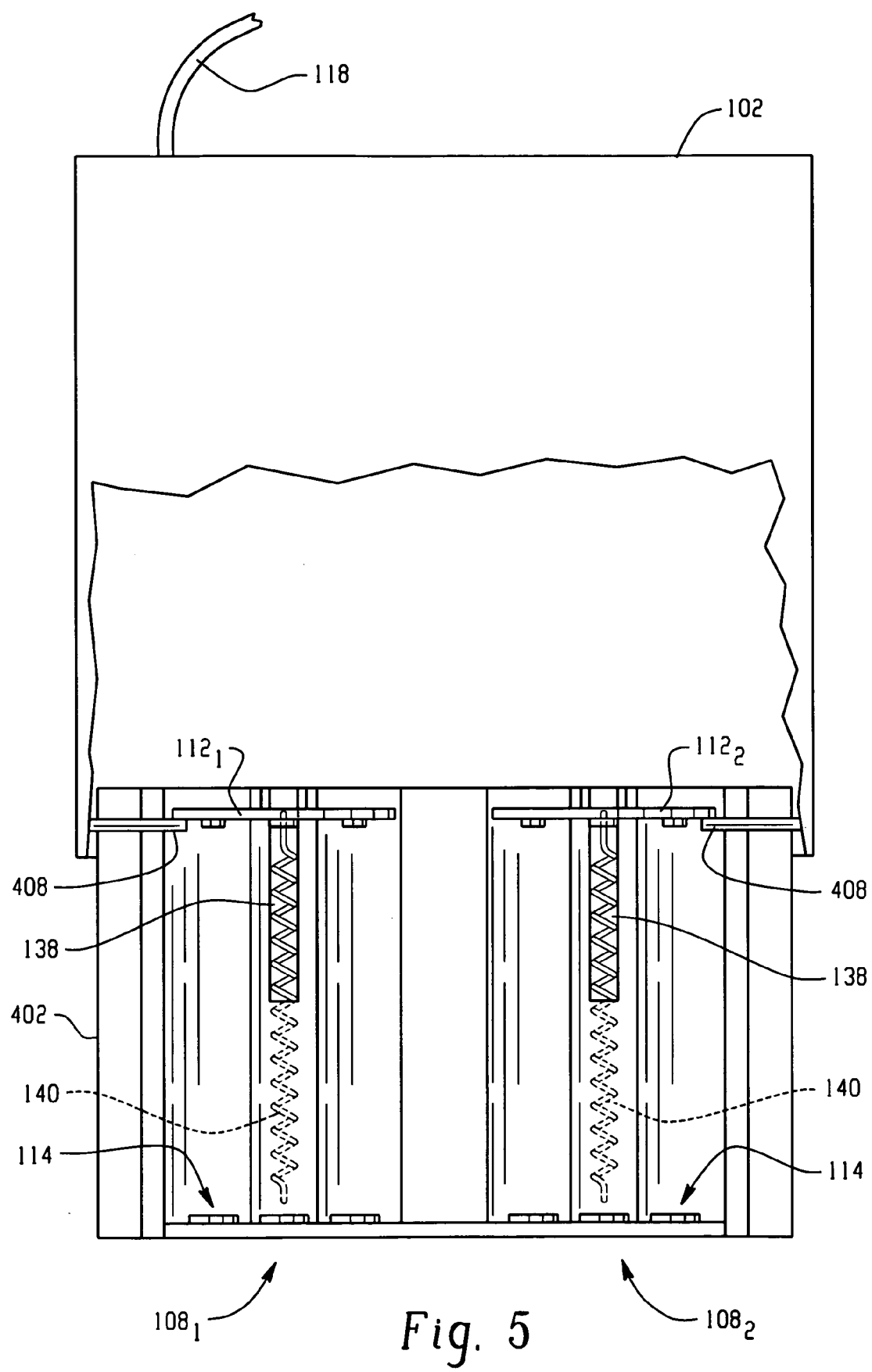
FIG. 5 is a top view of a battery charger.

In another variation which is illustrated in FIG. 5, the contact supports 112 may be carried by the tray 402, with springs 140 urging the movable contact supports 112 toward the front of the tray 402. When the tray 402 is opened, one or more protrusion(s) or pin(s) 408 extending from the bottom or sides of the housing 102 engage forward facing shoulders disposed on the movable contacts 112, thereby retracting them. When the cover is closed, the springs 140 urge the movable contacts 112 forward in the tray 402.

According to yet another implementation, the first 112 and second 114 contacts are formed at the first 122 and second 124 ends of the tray 402. A spring 140 urges the tray 402 toward the closed position, while a detent holds the tray 402 in the open position.

Figure 8:
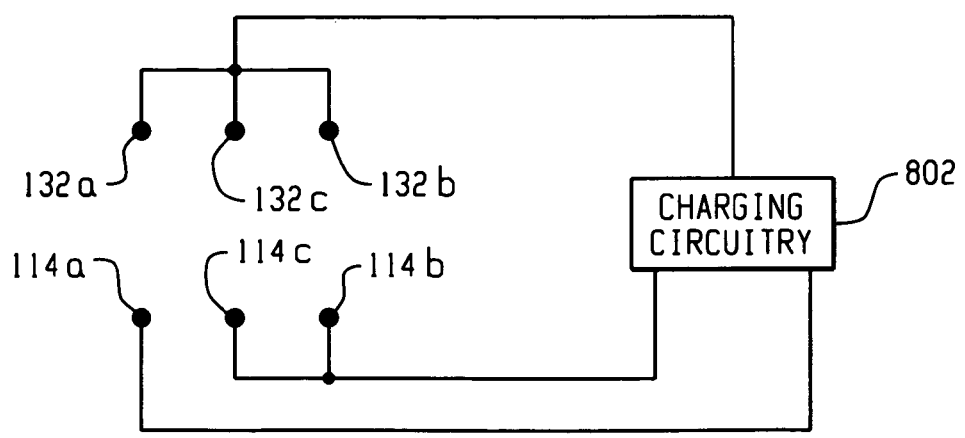
FIG. 8 depicts battery contact electrical connections.

Various electrical arrangements are also contemplated. For example, a separate charging channel may be provided each of the bays 108. In one such implementation, the battery contacts of a given bay is connected to the battery charging circuitry 802 as shown in FIG. 8. A particular advantage of such an arrangement is that the charging energy supplied to the outer batteries may be applied independently. However, it will also be appreciated that the second contacts 114a,b,c may also be connected together so that the outer batteries are connected electrically in parallel during charging. Similar connection schemes may also be implemented in connection with the arrangement of FIG. 3D, taking into account the relatively larger number of batteries.

Figure 6:
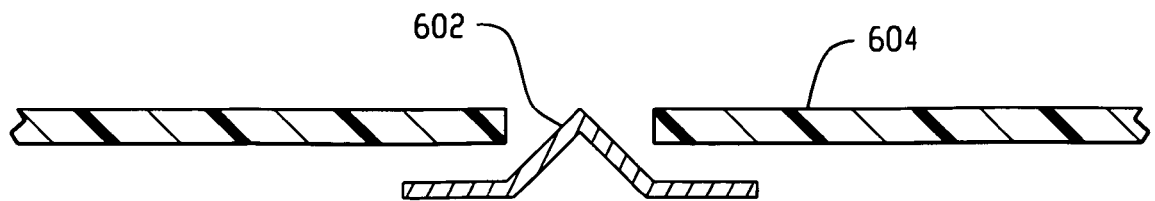
FIG. 6 depicts a recessed battery contact.

As illustrated schematically in FIG. 6, the first or second battery contacts 602 may be recessed in their respective support 604. Where a battery is inserted with the incorrect polarity, the negative battery terminal does not make electrical contact with the recessed contact 602. As a consequence, charging energy is not applied with the incorrect polarity.

In still another arrangement, the battery contacts 132, 114 and the charger electrical circuitry are designed to be polarity agnostic. For the purposes of the present application, polarity agnostic is defined to mean that the battery contacts 132, 114 will make electrical contact with either of the positive and negative terminals of a battery and that the electrical device will operate properly (e.g., a battery charger will charge batteries or a battery powered device will perform the function of the device) irrespective of the polarity in which the battery is inserted in a bay 108.

Figure 7:
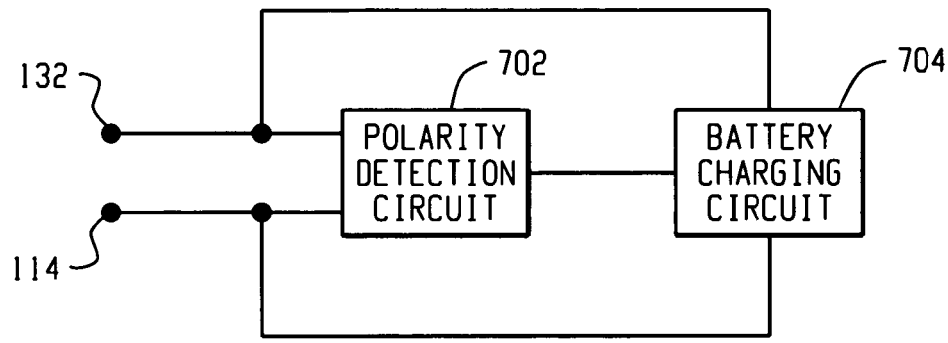
FIG. 7 is a block diagram of a polarity agnostic charging circuit.

A block diagram of an exemplary polarity agnostic battery charging circuit is depicted in FIG. 7. As shown at FIG. 7, the charging circuit includes a polarity detection circuit 702 and battery charging circuitry 704. The polarity detection circuitry 702 determines the polarity of one or more of the batteries received in a bay 108. The battery charging circuitry 704 applies the desired charging energy to the battery or batteries, with the polarity of the charging energy selected based on the detected battery polarity. Various polarity detection techniques are known in the art and can be selected based on application specific requirements. In such a configuration, the respective first 132 and second 114 battery contacts for the various batteries in a given bay 108 are not electrically connected so that the polarity of each battery may be individually detected and accounted for.

Figure 9:
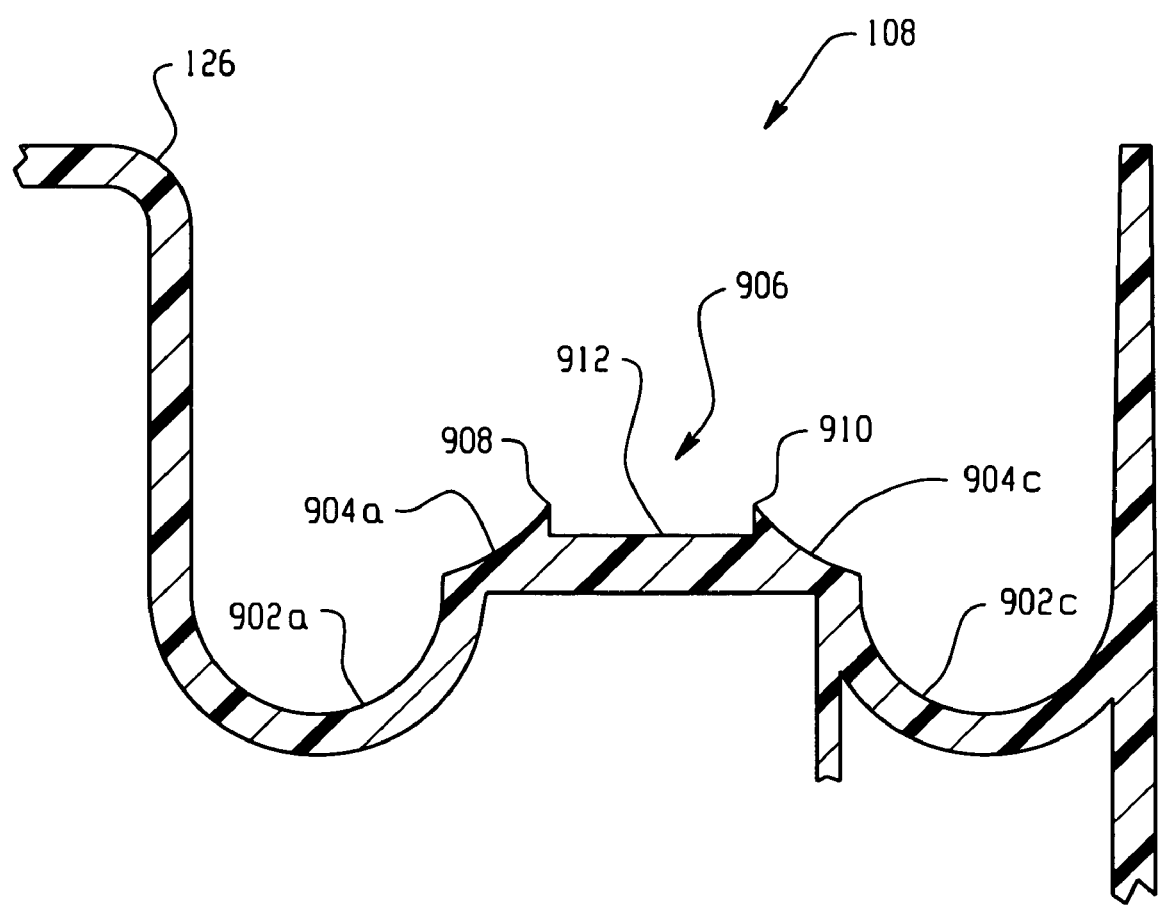
FIG. 9 is a cross-sectional view of a battery tray.

FIG. 9 is a cross sectional view of an alternate implementation of a battery tray 126 for an exemplary bay 108. The tray 126 is depicted generally at the position of section ID-ID shown in FIG. 1. The tray includes first 902a and 902c second outer battery supports which are dimensioned to support AAA size batteries. Additional outer supports 904a, 904b are likewise dimensioned to support a pair of relatively larger AA size batteries. A central region 906 includes a pair of upstanding, spaced apart protrusions 908, 910 which are configured to support AAA, AA, C, or D size cells. As illustrated, the spacing between and height of the protrusions are selected so that the batteries do not contact and are thus unsupported by the surface 912. Thus, the batteries are supported substantially along two (2) lines defined by the protrusions 908, 910. Alternately, the protrusions 908, 910 may be dimensioned so that a given size battery (e.g., a AAA size battery is also supported by the surface 912. It should also be noted that, as illustrated, the bay 108 will concurrently accept up to three (3) AAA or AA size batteries, with one (1) battery disposed in each of the outer positions and a third battery disposed in the central position.

It should also noted that the above described techniques are not limited to use with battery chargers and may also be used in connection with battery powered electrical devices.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A battery charger comprising:
    a first battery contact;
    a second battery contact;
    a first member in operative mechanical communication with the first battery contact, wherein moving the first member in a first direction causes the first battery contact to move away from the second battery contact, and wherein moving the first member in a different, second direction causes the first battery contact to move toward the second battery contact to make electrical contact with respective first and second terminals of the first; and a cover in mechanical communication with the first member.

2. The battery charger of claim 1 wherein the cover is movable to an open position that moves the first member in the first direction.

3. The battery charger of claim 1 wherein the first member includes a battery tray.

4. The battery charger of claim 1 wherein moving the first member in a first direction includes pivoting the first member about a pivot axis.

5. The battery charger of claim 1 including a second member in operative mechanical communication with the first battery contact and the first member, wherein the second member releasably urges the first battery contact away from the second battery contact.

6. The battery charger of claim 5 including a spring in operative mechanical communication with the first battery contact, wherein the spring urges the first battery contact toward the second battery contact.

7. The battery charger of claim 5 wherein the moving the first member in the second direction causes the second member to disengage from the first battery contact to accommodate batteries having different battery sizes.

8. The battery charger of claim 1 including a third battery contact;

a fourth battery contact;

wherein moving the first member in the first direction causes the third battery contact to move away from the fourth battery contact, and wherein moving the first member in the second direction causes the third battery contact to move toward the fourth battery to make electrical contact with respective first and second terminals of the second battery.

9. The battery charger of claim 1 including at least a first upwardly facing battery support.

10. The battery charger of claim 1 including a battery polarity detection circuit which detects the polarity in which the first battery is inserted in the first battery receiving region.

11. An apparatus including:

a body;

a first cover mounted for pivotal motion relative to the body, wherein the cover pivots between an open position for inserting at least a first battery in a battery receiving region of the apparatus and a second position;

a first pair of battery contacts in operative mechanical communication with the first cover, wherein pivoting the cover to the open position allows a first battery to be inserted between the first pair of battery contacts with substantially zero insertion force and pivoting the cover to the second position causes the first pair of battery contacts to apply a contact force to terminals of the first battery.

12. The apparatus of claim 11 including a first link member in operative mechanical communication with the first cover for releasably urging one of the first pair of contacts away from the other of the first pair of contacts.

13. The apparatus of claim 12 including a spring for urging one of the first pair of contacts toward the other of the first pair of contacts.

14. The apparatus of claim 11 including a second pair of battery contacts in operative mechanical communication with the first link member, wherein pivoting the cover to the open position allows a second battery to be inserted between the first pair of battery contacts with substantially zero insertion force and pivoting the cover to the second position causes the first pair of battery contacts to make electrical contact with first and second terminals of the second battery.

15. The apparatus of claim 14 including a slide member in operative mechanical communication with the first link member for releasably urging one of the first pair of contacts away from the other of the first pair of contacts and one of the second pair of contacts away from the other pair of contacts to accommodate different size batteries.

16. The apparatus of claim 11 including a battery bay configured to receive exactly one, two, or three AAA size batteries, exactly one, two, or three AA size batteries, exactly one C size battery, or exactly one D size battery.

* * * * *